United States Patent
Otten et al.

(10) Patent No.: US 10,036,413 B2
(45) Date of Patent: Jul. 31, 2018

(54) SCREW FOR AN ELECTRICALLY CONTACTING CONNECTION

(71) Applicant: Airbus Operations GmbH, Hamburg (DE)

(72) Inventors: Jürgen Otten, Hamburg (DE); Axel Kranich, Hamburg (DE); Stefan Schoenmeyer, Hamburg (DE)

(73) Assignee: Airbus Operations GmbH (DE)

(*) Notice: Subject to any disclaimer, the term of this patent is extended or adjusted under 35 U.S.C. 154(b) by 89 days.

(21) Appl. No.: 15/208,819

(22) Filed: Jul. 13, 2016

(65) Prior Publication Data

US 2017/0016474 A1 Jan. 19, 2017

(30) Foreign Application Priority Data

Jul. 15, 2015 (DE) .......................... 10 2015 111 456

(51) Int. Cl.
*F16B 33/00* (2006.01)
*F16B 33/02* (2006.01)
*F16B 1/00* (2006.01)

(52) U.S. Cl.
CPC .............. *F16B 33/02* (2013.01); *F16B 33/00* (2013.01); *F16B 2001/0064* (2013.01)

(58) Field of Classification Search
CPC .......... F16B 33/00; F16B 33/02; F16B 37/00; F16B 2001/0064
USPC ............................... 411/366.1, 368, 411, 436
See application file for complete search history.

(56) References Cited

U.S. PATENT DOCUMENTS

| 3,258,284 A * | 6/1966 | Phipps ................ E21B 17/0426 |
| | | 285/390 |
| 3,426,642 A | 2/1969 | Phipard, Jr. |
| 4,123,132 A | 10/1978 | Hardy et al. |
| 4,189,975 A * | 2/1980 | Nisida ..................... F16B 31/06 |
| | | 411/423 |

(Continued)

FOREIGN PATENT DOCUMENTS

| DE | 197 32 652 A1 | 2/1999 |
| DE | 102 35 817 A1 | 2/2004 |

(Continued)

OTHER PUBLICATIONS

German Search Report dated May 13, 2016.

*Primary Examiner* — Roberta S Delisle
(74) *Attorney, Agent, or Firm* — Lerner, David, Littenberg, Krumholz & Mentlik, LLP

(57) ABSTRACT

A screw for an electrically contacting connection includes a screw head and a thread having a thread profile with a first thread flank facing the screw head and a second thread flank facing away from the screw head. The first thread flank is continuously curved from a radially inner bottom region to a radially outer run-out region in such a way that first angles between the center axis and local tangents, which lie on the first thread flank and intersect the center axis of the screw, increase radially outward along this direction. The second thread flank and the center axis include a second angle, which lies below the maximum first angle, in the opposite direction of the first angle. The run-out region continuously connects the first thread flank and the second thread flank to one another and is completely rounded.

13 Claims, 2 Drawing Sheets

(56) References Cited

U.S. PATENT DOCUMENTS

| | | | | |
|---|---|---|---|---|
| 4,842,466 | A | * | 6/1989 | Wheeler ................ F16B 33/02 |
| | | | | 411/366.3 |
| 4,915,559 | A | * | 4/1990 | Wheeler ................ F16B 33/02 |
| | | | | 411/366.3 |
| 5,413,445 | A | * | 5/1995 | Cartellone ............. B66C 1/125 |
| | | | | 294/89 |
| 5,544,993 | A | | 8/1996 | Harle |
| 5,603,661 | A | * | 2/1997 | Grey ....................... E01B 7/10 |
| | | | | 411/386 |
| 5,609,455 | A | * | 3/1997 | McKewan ........... F16B 35/047 |
| | | | | 411/386 |
| 5,947,670 | A | | 9/1999 | Larson |
| 6,722,833 | B2 | | 4/2004 | Birkelbach |
| 6,848,724 | B2 | | 2/2005 | Kessler |
| 7,021,877 | B2 | | 4/2006 | Birkelbach et al. |
| 7,658,581 | B2 | * | 2/2010 | Sußenbach ......... F16B 25/0015 |
| | | | | 411/311 |
| 7,819,385 | B2 | * | 10/2010 | Hunter ................. F16K 3/0254 |
| | | | | 251/264 |
| 8,079,623 | B2 | | 12/2011 | Pallini, Jr. et al. |
| 2006/0263171 | A1 | * | 11/2006 | Schwarz ............ F16B 25/0021 |
| | | | | 411/411 |
| 2008/0226424 | A1 | * | 9/2008 | Matthiesen ........ F16B 25/0021 |
| | | | | 411/411 |

FOREIGN PATENT DOCUMENTS

| | | |
|---|---|---|
| DE | 103 08 130 A1 | 9/2004 |
| DE | 20 2005 009 694 U1 | 11/2006 |
| DE | 20 2008 012 210 U1 | 11/2008 |
| JP | 2010-223257 A | 10/2010 |
| WO | 2001/044672 A1 | 6/2001 |

* cited by examiner

SCREW FOR AN ELECTRICALLY CONTACTING CONNECTION

FIELD OF THE INVENTION

The invention relates to a screw for an electrically contacting connection, as well as to a screw system consisting of a screw, an internal thread and a spring washer.

BACKGROUND OF THE INVENTION

Various screws and other pin-shaped fastening means capable of connecting components to one another are known from the prior art. In this respect, it is frequently required to produce not only a purely mechanical connection, but also an electrical connection between two components. In order to produce a reliably contacting screw connection, it is desirable to minimize an electric contact resistance between the components to be electrically connected to one another.

In an electrically contacting screw connection, the design of the components used for this purpose may depend on the projected current flow. In the prior art, the contact resistance is adjustable, in particular, with the prestressing force of a screw connection and may to a certain degree also depend on the design of contact surfaces on the screw head and on a surface area of a component contacted therewith. It is also known to improve the electrical contact by utilizing serrated washers, the serrations of which cause localized damages to a coating or oxide layer and may thereby reduce the contact resistance.

BRIEF SUMMARY OF THE INVENTION

In order to produce a particularly sound electrical connection between components that are mechanically connected to one another, it would be desirable to have available connecting means that are improved in comparison with the prior art and result in a reduced contact resistance.

An aspect of the invention therefore may make available an improved connecting means that is capable of producing a very reliable electrical connection with a particularly low contact resistance, but only increases the costs insignificantly or not at all and requires minimal modifications of the components to be connected.

A screw for an electrically contacting connection having a screw head and a thread that has a thread profile and comprises a first thread flank facing the screw head and a second thread flank facing away from the screw head is described herein. The first thread flank is continuously curved from a radial inner bottom region to a radial outer run-out region in such a way that first angles between the center axis and local tangents, which lie on the first thread flank and intersect the center axis, increase radially outward along this direction. The second thread flank and the center axis include a second angle, which lies below the maximum first angle, in the opposite direction of the first angle. The run-out region continuously connects the first and the second thread flank to one another and is completely rounded.

The screw therefore comprises a screw core, on which an external thread is located. The shapes of the flanks defining the thread respectively are particularly obvious and definable in the plane of section of a longitudinal section through the screw that extends, in particular, parallel to the center axis. The thread flanks extend from a bottom region, which coincides with the screw core, to a radially outer run-out region, i.e. a run-out region that defines the outside diameter of the screw. The first thread flank facing the screw head is particularly characterized in that the local tangents of the first thread flank become steeper from the screw core toward the radially outer periphery. In other words, the local incline of the contour of the first thread flank increases radially outward. The second thread flank and the center axis simultaneously include a second angle that lies below the maximum first angle measured in the opposite direction.

Due to these asymmetrically designed thread flanks, the second thread flank facing away from the screw head can displace more material of the internal thread, into which the screw is driven, than the first thread flank facing the screw head. The screw according to an embodiment of the invention is thereby clearly distinguished from other screws known from the prior art.

For example, conventional screws are usually designed in such a way that more material is displaced in the direction of the screw head when the screw is tightened, i.e. with the first thread flank, while the second thread flank facing away from the screw head is relieved. Consequently, a gap may be created between the second thread flank and the internal thread, into which the screw is driven, wherein the second thread flank does not contact the corresponding thread flanks of the internal thread in said gap.

This is different with the screw according to an embodiment of the invention. Depending on the design and the material used, the first thread flank may have a very large angle of nearly 90° whereas the angle between the center axis and the second thread flank measured in the opposite direction is rather small. As a result, the second thread flank is not completely relieved when the screw is tightened such that both thread flanks come in contact with the material of the internal thread. The contact resistance between the screw and the component, into which the screw is driven, is lowered due to the thusly produced contact surface between the thread flanks, which clearly surpasses the contact surface produced with conventional screws. In this way, a significantly improved electrical conductor is made available.

The completely rounded run-out region may have a cross-sectional contour that forms a continuous and, in particular, uniformly curved supplement to both thread flanks and extends radially outward. It is particularly sensible to supplement the thread flanks with a circular arc section that has a predefined radius. Due to a completely rounded run-out section with this design, the material of the internal thread, into which the screw is driven, is uniformly displaced in order to reduce or largely prevent a notch effect, particularly in the internal thread.

In order to ensure that the largest surface possible is available for conducting electric currents, all screwed-in flights of the screw should be realized in a supporting fashion. It is also particularly advantageous to reduce the diameter of the screw core in comparison with conventional screws having the same thread dimension in order to increase the elasticity of the screw core and to thereby better tolerate an elongation of the screw. These measures altogether result in a significantly improved option of making available a highly conductive connecting element in dependence on the material of the screw and the length of the screw.

In an advantageous embodiment, the first angle continuously increases from the bottom region to the run-out region. This means that the first thread flank does not contain any points, in which the first angle once again decreases. However, it is not necessary to increase the angle in every point along the first thread flank. It would also be conceivable to provide a region with constant incline. The overall design of the thread is therefore very harmonic and capable of containing or completely preventing notch effects.

In a preferred embodiment, the first thread flank comprises a reinforcement region, as well as an adjacent first functional region radially outward thereof. The minimal first angle of the reinforcement region is inversely dependent on the hardness of the material of the screw and amounts to at least 40° and no more than 70°, preferably 45° to 60°, i.e. the first thread flank respectively includes an angle of at least 20° or preferably 30° with a line extending perpendicular to the center axis of the screw.

The reinforcement region occupies no more than one third of the radial extent of the first thread flank and may be realized with a largely constant incline or with an at least sectionally increasing incline. The reinforcement region therefore forms a base region of the thread profile with a greater strength that is dependent on the first angle within the reinforcement region and the second angle. The harder or stronger the material of the screw, the smaller the first angle of the reinforcement region should be chosen in order to increase the elasticity of the thread. When harder materials are used, the angle between the reinforcement region and the line extending perpendicular to the center axis of the screw therefore should be larger than in instances, in which softer materials are used. In this way, the largest surface possible for conducting electric currents may be realized.

If it is planned to realize the first thread flank with an increasing incline in the reinforcement region, the first thread flank may at least in the reinforcement region have an essentially parabolic shape radially outward from the bottom region. In this way, the flights can be realized with a particularly high strength in the radially inner regions.

The functional region has a minimal first angle that exceeds the maximum first angle of the reinforcement region by at least 5°. A transition region lies between the reinforcement region and the functional region and forms a rounding. Consequently, the first thread flank comprises two regions that are arranged slightly angular to one another and connected to one another by means of a rounding. In this way, the reinforcement region and the functional region may be designed and realized separately of one another.

The functional region may furthermore have a largely constant incline such that the external thread and a corresponding internal thread may very easily be adapted to one another and a uniform surface pressure may be achieved.

In another advantageous embodiment, the first angle increases from the bottom region toward the run-out region in a strictly continuous fashion. The angle therefore increases everywhere, i.e. in every point along the first thread flank, such that the deformability of the thread is additionally improved and two-sided contact between the thread flanks and the corresponding thread flanks of the external thread may very reliably be produced.

In order to reduce or completely eliminate notch effects in a region near the screw core, the thread comprises a radially inner bottom region that is rounded and continuously transforms into the first thread flank.

The local distance between the first thread flank and the second thread flank measured parallel to the center axis continuously decreases radially outward. The thusly achieved elasticity of the thread can additionally improve the reliability of the electrical connection.

In an advantageous embodiment, the second thread flank has an essentially constant incline from the bottom region to the run-out region and therefore a straight contour. The more complex shape of the first thread flank is not required for the second thread flank because the second thread flank has to displace more material of the internal thread penetrated by the screw than the first thread flank. This thread flank therefore may correspond to the thread flank of a conventional thread, which faces away from a screw head, and additionally comprises a rounding on its radially outer end.

The second angle and the progression of the first angle are realized in such a way that at least sections of the first thread flank are elastically bent into a direction facing away from the screw head when the screw is tightened in an internal thread with a defined torque and the first thread flank, as well as the second thread flank, consequently are in surface contact with corresponding flanks of the internal thread. The contour of the thread therefore has to be designed in dependence on the material such that the screw is continuously deformed or elongated when it is driven into an internal thread.

The invention furthermore relates to a screw system, particularly for electrically and mechanically connecting two components, comprising a screw of the above-described type, a spring washer, as well as an internal thread in one of the two components.

The internal thread of the spring washer basically has to be adapted to the external screw thread, wherein a reinforcement region of the first thread flank should at least largely lie in a gap between the screw thread and the inside diameter of the internal thread. Material in the form of a bulge or a burr may be admitted into this gap during the displacement of material by the second thread flank of the screw due to cold working between the screw and the spring washer. From a structural point of view, the design of the internal thread of the component therefore is somewhat simpler than that of the external screw thread. Although the screw by itself may already produce superior electrical contact in comparison with conventional screws without a spring washer, the use of the spring washer makes it possible to achieve an additional improvement to the effect that the screw may also be used for being fastened on sheet-like or other thin-walled components because it additionally or exclusively produces a mechanical connection with the spring washer.

The internal thread of the spring washer may geometrically be exactly adapted to the external screw thread such that the advantages of the invention may only be harnessed with a certain surface pressure between the spring washer and the screw. Alternatively, a flank of the internal thread corresponding to the first thread flank and the center axis of the screw or the spring washer may include first angles that slightly differ and are somewhat larger than the first angles of the external screw thread. Consequently, the first thread flank of the internal thread may be somewhat steeper than the first thread flank of the external screw thread and the angle between the first thread flank of the internal thread and a line extending perpendicular to the center axis may be smaller than that of the external screw thread.

Consequently, the internal thread of the spring washer may comprise first thread flanks that correspond to the first thread flanks of the screw thread, wherein the first thread flanks and the center axis of the spring washer include at least one angle that is larger than the maximum first angle of the first thread flank of the screw thread. The angle of the first flank of the internal thread decisively depends on the material used and may lie between 5° and 10° referred to a line extending perpendicular to the center axis of the internal thread when softer metals such as aluminum are used and below or as high as 5° when harder metals such as titanium are used.

If the first angles of the first thread flanks of the external thread and of the internal thread deviate from one another, the first thread flanks of the screw are pushed away from the screw head when the screw is driven into the internal thread such that the second thread flanks also have to actively displace material within the internal thread of the spring washer in the untensioned state of the screw being tightened. In addition to the surface contact between all thread flanks of the screw and the spring washer, the thusly produced surface pressure also serves for realizing or promoting a reverse lock. The system consisting of screw and spring washer consequently may be used in particularly vibration-prone environments such as in vehicles and especially in aircraft.

The spring washer may furthermore comprise a catch profile in order to ensure active tightening of the screw and the spring washer.

BRIEF DESCRIPTION OF THE DRAWINGS

Other characteristics, advantages and potential applications of the present invention result from the following description of exemplary embodiments and the figures. In this respect, all described and/or graphically illustrated characteristics form the object of the invention individually and in arbitrary combination, namely regardless of their composition in the individual claims or their references to other claims. In the figures, identical or similar objects are furthermore identified by the same reference symbols.

DETAILED DESCRIPTION

Figure 1:
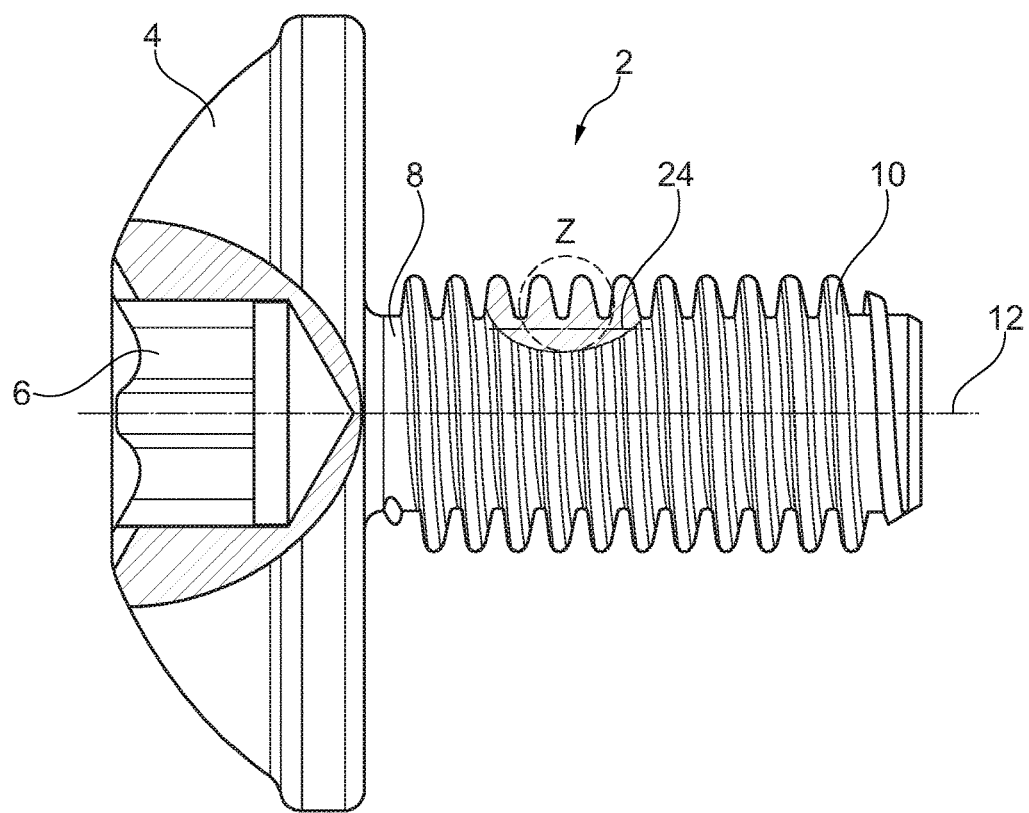
FIG. 1 shows a side view with two partial sections through a screw, as well as an enlargement of one partial section.
Figure 1:
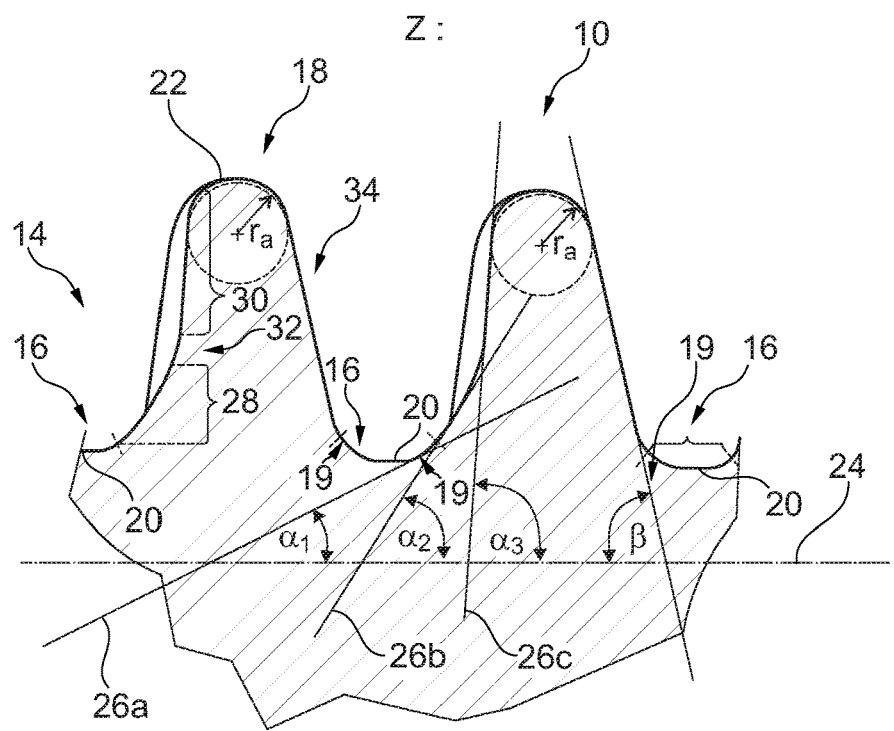

FIG. 1 shows a screw 2 with a screw head 4 that comprises a catch profile 6, a screw core 8, as well as an external thread 10 arranged thereon. The screw 2 does not comprise a shaft, but this is irrelevant to the function according to an embodiment of the invention. It would just as well be possible to realize screws according to an embodiment of the invention that comprise a more or less distinct shaft without flights arranged thereon. The design according to an embodiment of the invention of the external thread 10 is illustrated in greater detail in an enlarged section Z in the longitudinal direction along a center axis 12.

On a side that faces the screw head 4, the thread 10 comprises a first thread flank 14 that extends radially outward from a bottom region 16 to a run-out region 18. At its radially inner point 20, the bottom region 16 coincides with the screw core 8 and may have a completely rounded contour or comprise a plateau comprising the radially inner point 20, which continuously transforms into curved roundings 19 that are particularly provided with a constant curvature radius. Consequently, the bottom region 16 extends between and is defined by the uniformly curved roundings 19 as illustrated with broken lines directly adjacent thereto.

The radially outer point 22 of the run-out region 18 represents the outside diameter of the thread 10. A local tangent, which includes a first angle with the center axis 12, may be formed in any point along the first thread flank 14. As an example, the first thread flank 14 includes local first angles α1, α2, α3, etc., with the center axis 12, parallel to which an artificial line 24 is drawn, wherein these first angles increase from the bottom region 16 to the run-out region 18. This is associated with local tangents 26a, 26b, 26c, etc., which include the respective angle α1, α2, α3, etc., in an intersecting point with the center axis 12.

For example, the thread 10 is realized in such a way that the first thread flank 14 comprises a reinforcement region 28, which approximately extends over one third of the radial extent of the first thread flank 14 and after which a functional region 30 is provided. The reinforcement region 28 is altogether realized somewhat flatter than the functional region 30 such that a widened base is formed and provides the thread 10 with corresponding stability. At least one rounding is provided in a transition region 32 integrated between the reinforcement region 28 and the functional region 30 in order to continuously supplement the first thread flank 14. In the functional region 30, the first thread flank 14 may assume an angle α3 that is significantly steeper than in the reinforcement region 28 and may amount to nearly 90°.

It is preferred that at least the reinforcement region 28 has a parabolic contour, in which the incline of the first thread flank 14 is proportional to the axial position along the center axis 24 and in which the radial distances are proportional to the square of the axial position along the center axis 24. This makes it possible to achieve a uniform deformation of the first thread flank 14 and a uniform displacement of material of an internal thread, into which the screw 2 is driven.

A second thread flank 34 is arranged on a side facing away from the screw head 4 and includes an angle β with the center axis 12, wherein this angle lies below a minimal angle of the functional range 30, which may coincide with α3 in a flat or sectionally plane design of the functional region 30 with largely constant incline. The second thread flank 34 displaces material of an internal thread that receives the screw 2 and is not illustrated in FIG. 1, wherein this consequently also leads to a deformation of the thread 10 and to the surface contact between both thread flanks 14 and 34 and the corresponding flanks of the internal thread.

The run-out region 18 is completely rounded and therefore leads to a uniform displacement of material, wherein this rounded run-out region may simultaneously prevent notch effects, particularly in the internal thread, into which the screw 2 is driven. A construction circle is drawn with dashed lines in the run-out region 18 and representative for the dimensions of a circular arc that may be used for rounding the run-out region 18. A radius $r_a$ of this construction circle may preferably be chosen proportionally to the hardness of the material.

Figure 2A:
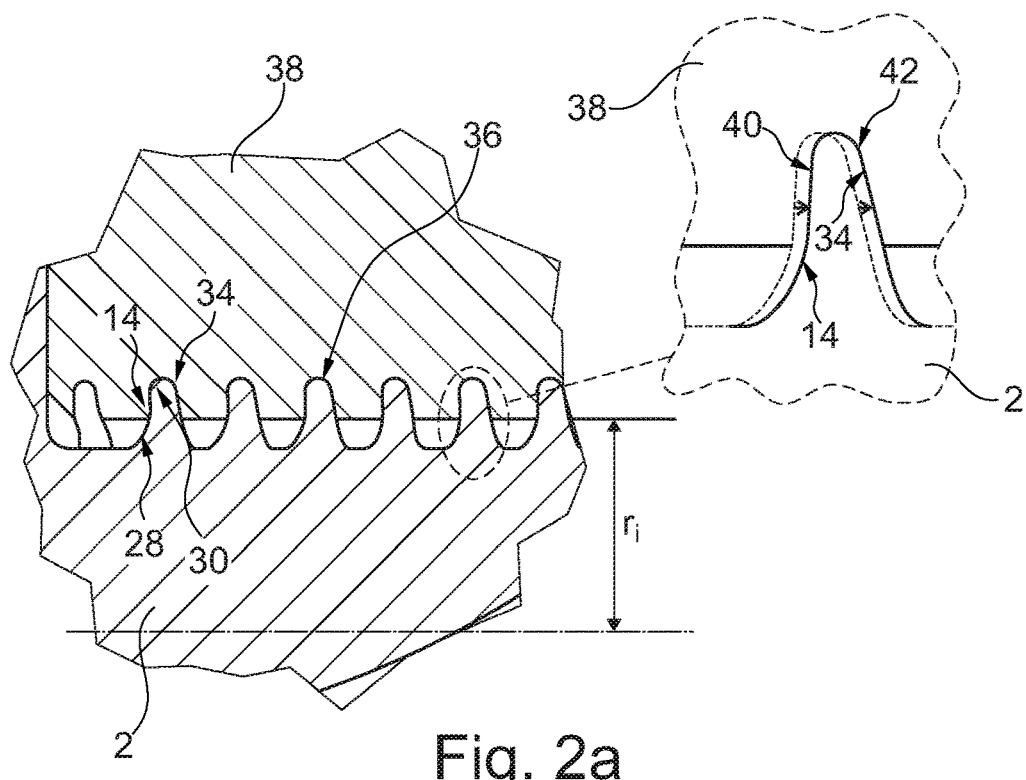
FIGS. 2a and 2b respectively show an internal thread or a spring washer with an internal thread in the form of sectional representations with and without a screw driven therein.

FIG. 2a shows a sectional representation of an internal thread 36 and a spring washer 38, which is only partially illustrated and into which the screw 2 is driven. The inside diameter $r_i$ of the internal thread 36 ends radially outside of the reinforcement region 28 and therefore comprises only a section of the second thread flank 34 and the functional region 30. The internal thread 36 therefore has a somewhat simpler design than the external thread 10 of the screw 2. The inside radius $r_i$ may furthermore be chosen in dependence on the material. When using softer metals such as aluminum, the inside radius $r_i$ may be greater than in instances, in which harder metals such as titanium are used.

In this illustration, the internal thread 36 and the external thread 10 of the screw completely engage into one another and all facing thread flanks press against one another. Due to the generated surface pressure, the thread flanks 14 and 34 are displaced toward the right in the plane of projection and form a particularly large contact surface for corresponding flanks 40 and 42 of the internal thread 36.

Figure 2B:
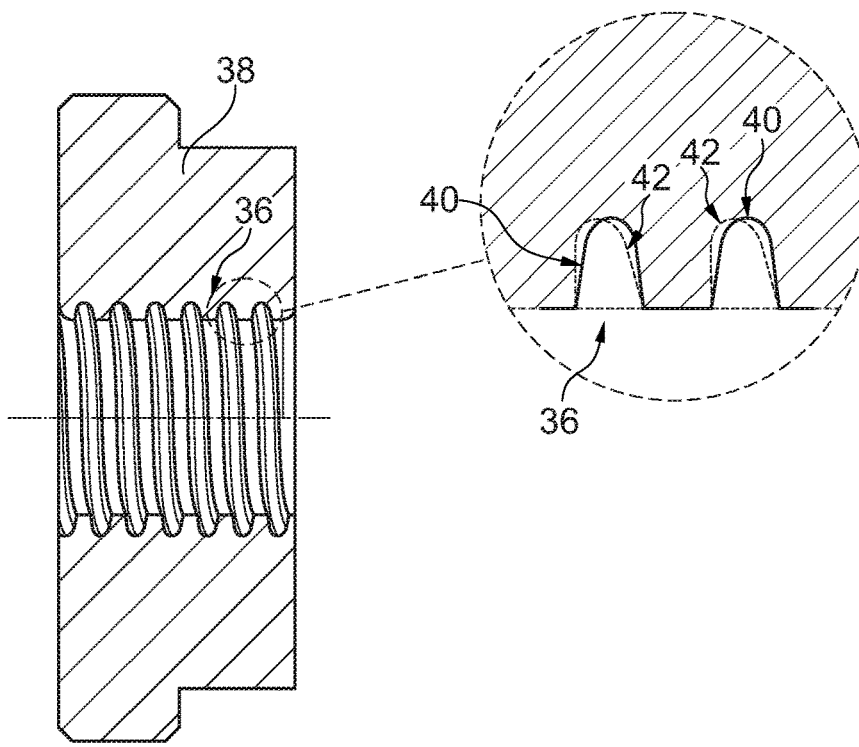

FIG. 2b shows the spring washer 38 with the internal thread 36 integrated therein in the form of a longitudinal section, as well as in the form of an enlarged detail. This figure elucidates that a first thread flank 40 of the internal thread 36 of the spring washer 38, which corresponds to the first thread flank 14 of the screw 2, is somewhat flatter than the first thread flank 14 in a functional region 30. As an example, this figure shows a first angle y relative to a line extending perpendicular to the center axis 12, wherein this angle may differ depending on the material of the internal thread 36. If the spring washer 38 is made of aluminum, for example, the angle y may lie in a range between 5° and 10°. In this way, a slight undercut may be created between the first flanks 14 of the screw 2 and the internal thread 36, wherein this undercut leads to a deformation of the respective thread flanks 14, 24 and 40, 42 such that the size of the electric contact surfaces and therefore the contact resistance are influenced.

The screw may simultaneously be secured with such a design of the spring washer 38 because the tightening torque, which also defines the backdriving torque, may amount up to a few Nm. Consequently, a vibration-related separation between the screw 2 and the spring washer 38 may practically be ruled out.

As a supplement, it should be noted that "comprising" does not exclude any other elements or steps, and that "a" or "an" does not exclude a plurality. It should furthermore be noted that characteristics or steps that were described with reference to one of the above exemplary embodiments may also be used in combination with other characteristics or steps of other above-described exemplary embodiments. Reference symbols in the claims should not be interpreted in a restrictive sense.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A screw for an electrically contacting connection, the screw comprising:
   a screw head; and
   a thread having a thread profile with a first thread flank facing the screw head and a second thread flank facing away from the screw head,
   wherein the first thread flank is continuously curved from a radially inner bottom region to a radially outer run-out region in such a way that first angles between a center axis of the screw and local tangents, which lie on the first thread flank and intersect the center axis of the screw, increase radially outward along this direction,
   wherein the second thread flank and the center axis enclose a second angle, which lies below the maximum first angle, in the opposite direction of the first angle, and
   wherein the run-out region continuously connects the first thread flank and the second thread flank to one another and is completely rounded.

2. The screw of claim 1, wherein the first angle continuously increases from the bottom region to the run-out region.

3. The screw of claim 1,
   wherein the first thread flank comprises a reinforcement region and an adjacent functional region radially outward thereof,
   wherein the minimal first angle of the reinforcement region is directly dependent on the hardness of the material of the screw and amounts to at least 40°, and
   wherein the reinforcement region occupies no more than one third of the radial extent of the first thread flank.

4. The screw of claim 3, wherein the minimal first angle in the reinforcement region amounts to no more than 70°.

5. The screw of claim 3, wherein the first thread flank has in the reinforcement region an essentially parabolic shape radially outward from the bottom region.

6. The screw of claim 3, wherein the functional region has a minimal first angle that exceeds the maximum first angle of the reinforcement region by at least 5°, and
   wherein a transition region lying between the reinforcement region and the functional region forms a rounding.

7. The screw of claim 1, wherein the first angle increases from the bottom region to the run-out region in a strictly continuous fashion.

8. The screw of claim 1, wherein the thread comprises a rounded bottom region that lies radially inward and the first thread flank continuously transforms into this bottom region.

9. The screw of claim 1, wherein the local distance between the first thread flank and the second thread flank measured parallel to the center axis continuously decreases radially outward.

10. The screw of claim 1, wherein the second thread flank has an essentially constant incline from the bottom region to the run-out region.

11. The screw of claim 1, wherein the second angle and the progression of the first angle are realized in such a way that at least sections of the first thread flank are elastically bent into a direction facing away from the screw head when the screw is tightened in an internal thread with a defined torque and the first thread flank, as well as the second thread flank, are in surface contact with corresponding flanks of the internal thread.

12. A screw system comprising:
   a screw comprising:
      a screw head; and
      a thread having a thread profile with a first thread flank facing the screw head and a second thread flank facing away from the screw head; and
      a spring washer with an internal thread that is screwable on the screw,
   wherein the first thread flank is continuously curved from a radially inner bottom region to a radially outer run-out region in such a way that first angles between a center axis of the screw and local tangents, which lie on the first thread flank and intersect the center axis of the screw, increase radially outward along this direction,
   wherein the second thread flank and the center axis of the screw enclose a second angle, which lies below the maximum first angle, in the opposite direction of the first angle, and wherein the run-out region continuously connects the first thread flank and the second thread flank to one another and is completely rounded.

13. The screw system of claim 12, wherein the internal thread of the spring washer comprises first thread flanks corresponding to the first thread flanks of the thread of the screw,
wherein the first thread flanks and a center axis of the spring washer enclose at least one angle that is greater than the maximum first angle of the first thread flank of the thread of the screw.

* * * * *